UNITED STATES PATENT OFFICE.

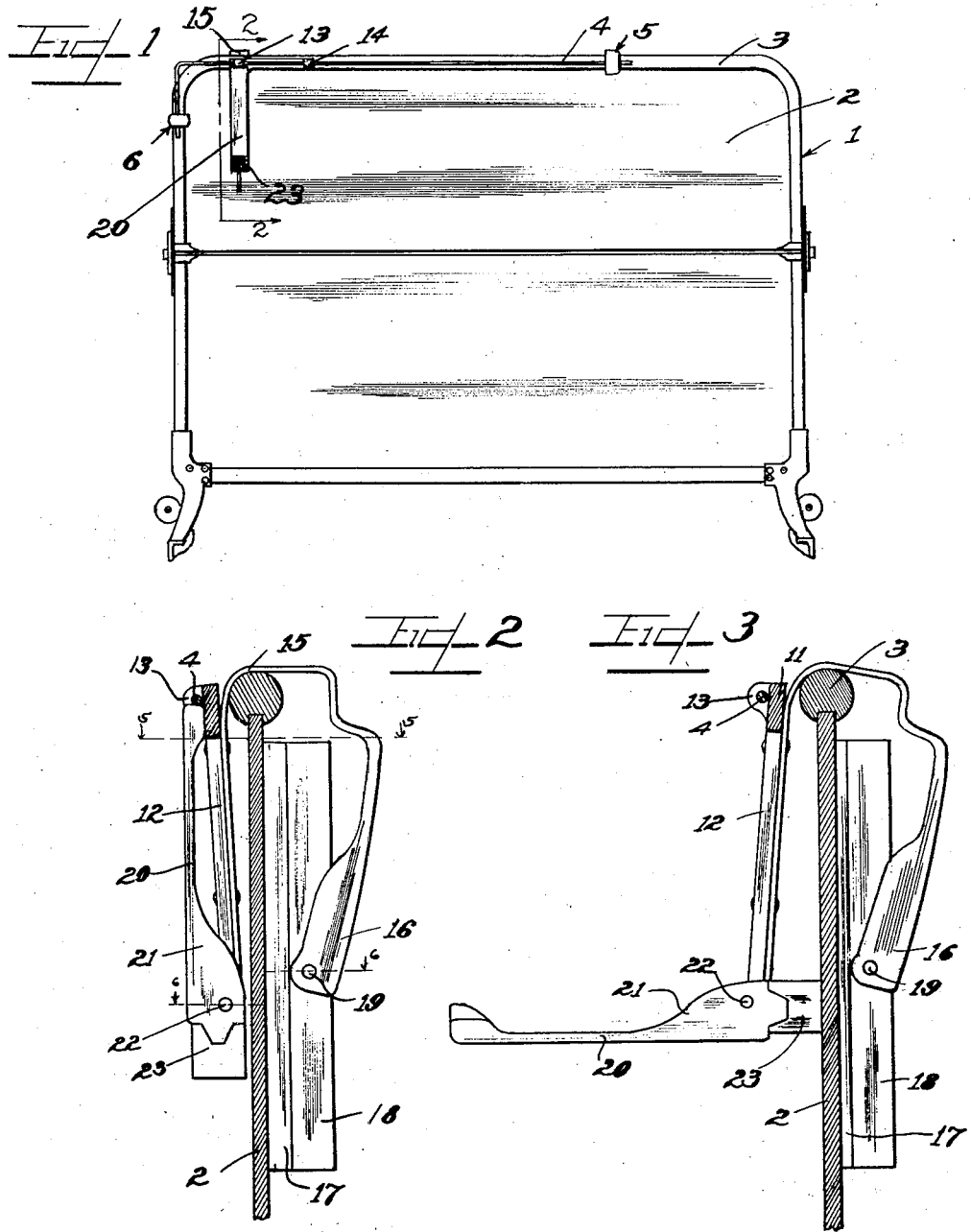

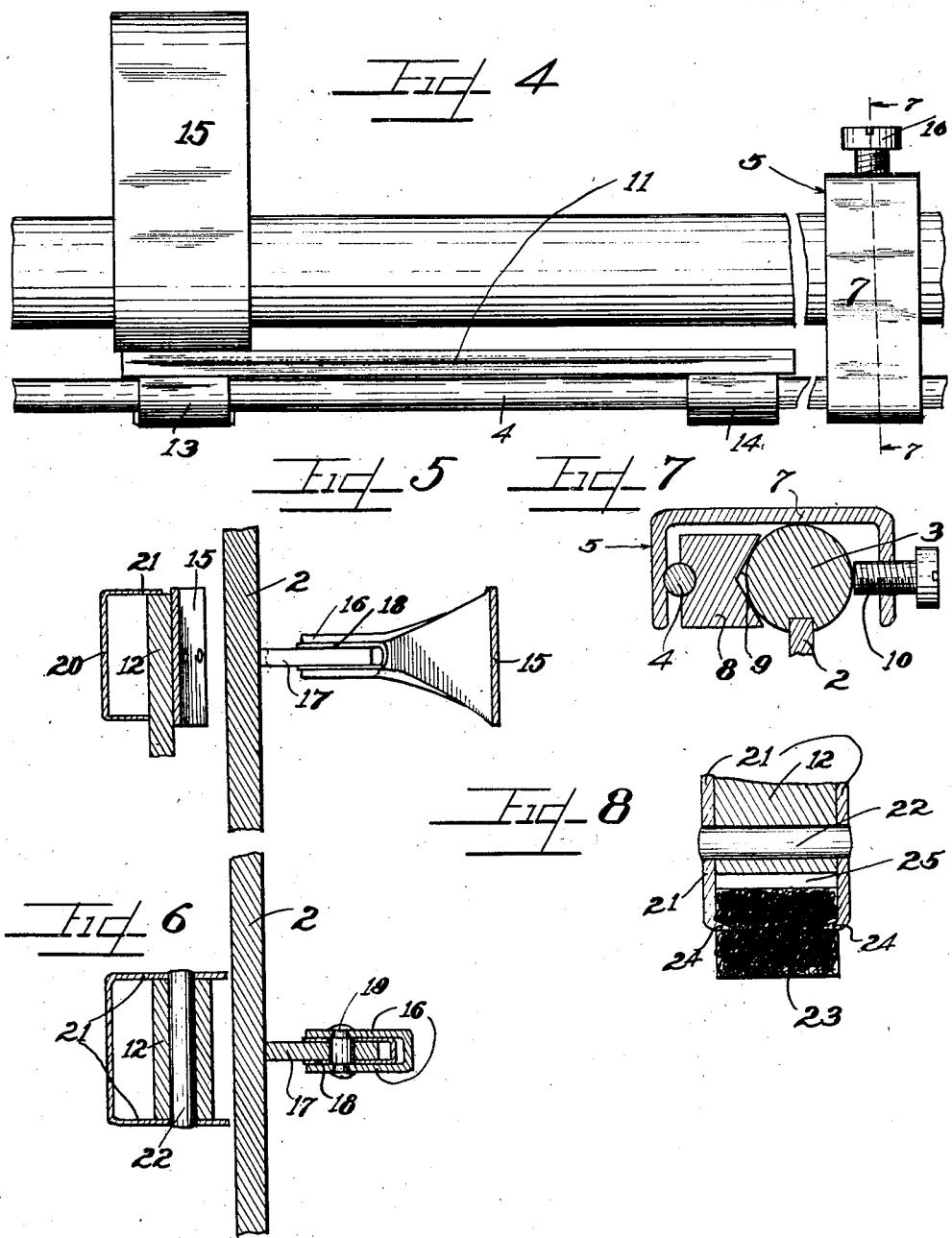

EDWARD A. TVERDAHL, OF EVANSTON, ILLINOIS.

WINDSHIELD-CLEANING DEVICE.

1,350,751.  Specification of Letters Patent.  Patented Aug. 24, 1920.

Application filed August 14, 1919. Serial No. 317,524.

*To all whom it may concern:*

Be it known that I, EDWARD A. TVERDAHL, a citizen of the United States, and a resident of the city of Evanston, in the county of Cook and State of Illinois, have invented certain new and useful Improvements in Windshield-Cleaning Devices; and I do hereby declare that the following is a full, clear, and exact description of the same, reference being had to the accompanying drawings, and to the numerals of reference marked thereon, which form a part of this specification.

This invention relates to windshield cleaning devices adapted to be operated by the driver of an automobile to clean drops of rain or snow from the front of the windshield.

A disadvantage of cleaning devices as heretofore constructed is that they press upon the windshield with the same pressure at all times, consequently, the rubber is apt to become deformed by continued pressure against the glass and further, when the car has not been in use for sometime, the rubber is very likely to stick to the glass under the pressure which is exerted thereon.

It is an object, therefore of the present invention to provide means for guiding a windshield cleaning device in its to and fro movement across the windshield.

A further object of the invention is to provide means for increasing the pressure of the rubber cleaning element against the windshield during the cleaning operation thereby avoiding the necessity of normally pressing the rubbing element more closely against the windshield than is necessary to avoid rattling.

Other and further important objects of this invention will be apparent from the disclosures in the specification and the accompanying drawings.

The invention (in a preferred form) is illustrated in the drawings and hereinafter more fully described.

On the drawings:

Figure 1 is an elevation of a windshield having applied thereto a cleaning device embodying the features of the present invention.

Fig. 2 is a section on the line 2—2 of Fig. 1.

Fig. 3 is a view similar to Fig. 2 showing the operating handle in lowered position.

Fig. 4 is a plan view of a portion of the windshield and windshield cleaner.

Fig. 5 is a section on the line 5—5 of Fig. 3.

Fig. 6 is a section on the line 6—6 of Fig. 2.

Fig. 7 is a section on the line 7—7 of Fig. 4.

Fig. 8 is a section on the line 8—8 of Fig. 2.

As shown on the drawings:

The improved windshield cleaning device is shown applied to a windshield 1, of ordinary construction having an upper pane of glass 2, supported in the usual way by a metal bead or frame 3. A guide rod 4, for the windshield cleaning device is secured to the frame 3, parallel thereto but spaced therefrom. For this purpose clamps 5 and 6 are provided, the construction of which is shown more particularly in Fig. 7. Each of these clamps comprise a yoke or stirrup 7, having a grooved inner face to receive the rod 4 and press it against a similar groove in the outer face of the spacing block 8. The inner face of this block is V-shaped as at 9, in order that it may be firmly clamped against the frame 3, by means of a set screw 10, having threaded engagement with the opposite part of the stirrup 7. Slidably mounted upon the rod 4, is a bar 11, having a depending portion 12, extending downwardly therefrom substantially at right-angles. Lugs 13 and 14 are provided at the ends of this bar 11 through which rod 4 may pass so that the bar 11 may slide to and fro on the rod 4. The bar 4 is preferably bent downwardly and secured to the vertical frame of the windshield by the clamp 6 as shown in Fig. 1.

Secured upon to the inner face of the depending part 12 is one end of a U-shaped plate spring 15, adapted to extend over the top of the frame 3, as shown more particularly in Fig. 2. The other end of this plate spring is bent laterally inward so as to provide a pair of cheek pieces 16, between which a strip of rubber 17 is arranged. This strip of rubber 17, is arranged in a U-shaped metal support 18, pivotally connected to the cheek pieces 16, by means of a rivet 19, so that it may turn angularly with respect to the latter as occasion requires.

An operating handle 20, is provided conveniently formed from a piece of channelled sheet metal. The lower portions of the webs 21, of this handle straddle the lower part of the parts 12 and are pivotally secured thereto by suitable means such as a rivet 22. At its upper end, these webs are arranged to have frictional engagement with the underside of the rod 4, in order to hold the handle 20, in elevated position. At its lower end the handle is provided with a felt block 23, so that when the handle is depressed into the position shown in Fig. 3, this block comes in contact with the glass of the windshield and presses the member 12 away from the windshield. This movement of the member 12, away from the windshield causes the other end of the spring to press the rubber strip 17 firmly against the opposite side of the windshield. The method of securing this felt block 23, to the handle 20, is shown more particularly in Fig. 8. The lower ends of the webs 21 are bent inwardly into the felt as at 24, to firmly grip the same while at the same time the block is supported by an inturned portion 25 of the central part of the handle 20.

The operation is as follows:

The handle 20 is first pulled out of contact with the rod 4, and moved into the position shown in Fig. 3. This brings the felt block 23, into engagement with the inner face of the windshield thereby forcing the lower ends of the part 12 and the inner end of the spring 15 away from the windshield. This causes the other end of the spring to press the rubber strip 17, more firmly against the outer face of the windshield. The whole device is then moved to and fro along the windshield by means of the handle and when the windshield is cleaned the handle is then moved upwardly until it frictionally engages the rod 4. This upward movement of the handle relieves the pressure of the spring upon the rubber strip so that the latter is not deformed and is not pressed against the glass so strongly that it will adhere thereto.

I am aware that numerous details of construction may be varied through a wide range without departing from the principles of this invention, and I therefore do not purpose limiting the patent granted otherwise than necessitated by the prior art.

I claim as my invention:

1. A windshield cleaning device comprising a guide, means for securing the guide to the upper edge of a windshield, a cleaning device slidable along the guide and a folding handle for operating the cleaning device.

2. A windshield cleaning device comprising a rubbing member adapted to engage the outer face of the windshield, a spring member connected to the rubbing member and extending over the top of the windshield; a handle pivoted on the spring member, and means on the handle engaging the inner face of the windshield when the handle is in operative position.

3. A windshield cleaning device comprising a rubbing member adapted to engage the outer face of the windshield, an operating member adapted to engage the inner face of the windshield, a spring extending over the top of the windshield having its ends connected to said members, a handle pivotally connected to the lower part of the operating member, and resilient means connected to the inner end of the handle below the pivotal connection whereby the pressure of the rubbing member against the windshield is increased when the handle is in a horizontal position and decreased when the handle is in a vertical position.

In testimony whereof I have hereunto subscribed my name in the presence of two subscribing witnesses.

EDWARD A. TVERDAHL.

Witnesses:
EARL M. HARDINE,
OSCAR HARTMANN.